000
United States Patent Office 3,081,162
Patented Mar. 12, 1963

3,081,162
CONTROLLING BINDWEED WITH 2,3,6-TRICHLO-ROBENZOIC ACID AND SALTS THEREOF
Nathaniel Tischler, Jamesburg, N.J., assignor to Heyden Newport Chemical Corporation, a corporation of Delaware
No Drawing. Filed Nov. 27, 1956, Ser. No. 624,503
1 Claim. (Cl. 71—2.6)

The present invention relates to controlling undesirable plant growth, that is, weeds, in an extended natural area normally supporting such plant growth and which may or may not normally support desirable plant growth, such as, crops. The undesirable plant growth may already exist in the area or it may be growth which otherwise would subsequently appear in the area and is controlled by treatment of the soil. The present invention is also concerned with novel herbicidal compositions for carrying out the present process.

This application is a continuation-in-part of my copending application Serial No. 515,263, filed June 13, 1955, now abandoned, and an application Serial No. 622,739, executed by me on November 16, 1936, and filed on November 19, 1956, for improvement in Controlling Weed Growth in a Corn Crop, this last mentioned application being a continuation-in-part application of my copending applications Serial No. 515,262, filed June 13, 1955, now abandoned, Serial No. 529,953, filed August 22, 1955, now abandoned, and Serial No. 463,829, filed October 21, 1954, now abandoned.

Despite great progress in recent years in the development of herbicides, there has remained a dual problem of weed control in extended natural areas. This problem has been defined by the number and variety of weeds which occur in such areas and by the cost of the frequent treatments that have been necessary. Known herbicides, generally speaking, have been deficient in either or both respects that they have been too selective in herbicidal effects, leaving many weeds unscathed, or that their effect has been too transient, requiring frequently repeated applications.

The areas which have called for improved weed control are represented by both cultivated and uncultivated fields. A typical example of a cultivated field is one devoted to the growing of corn, one of our major crops, where a wide variety of weeds are encountered and where mechanical cultivation is still the commonly employed method of weed control because available chemicals are either incapable of controlling all of most of the weed species or are incapable of controlling the susceptible weeds without damaging the crop.

Representative uncultivated or non-crop areas or fields, where improved weed control has been wanted, are the roadsides of highways or railroads and clearings for electrical power lines, together with certain pasture and range areas and smaller areas such as unpaved parking lots, driveways and courts where all plant growth is undesired. Typically, these areas normally support the growth of a considerable variety of weeds, commonly with three or more species present in some abundance; and although the weed population varies in species or in the abundance of particular species in different climates, the common characteristic is that the weed population comprises a number of species, with a few predominant, and that the cost factor works against the adoption of chemical weed control because the transient effect of many herbicides would make frequent application necessary. The problem is especially acute in areas populated by woody plants because of their capacity to survive the effects of many herbicides, despite temporary impairment of their foliage growth.

I refer to these areas, both cultivated and uncultivated, as extended natural areas. They are extended areas, often of very great acreage, in the sense that chemical weed control involves a substantial usage of the chemical employed in a single treatment, and repeated treatments multiply the cost of control to a point where the savings in labor and equipment becomes off-set by the cost of the chemicals, especially when one or more of the abundant weed species are resistant to the chemical treatment, and mechanical or manual methods continue to be required for suppression of the substantial remainder of undesired growth.

The extended areas dealt with here are "natural" areas in the sense of being out-of-doors, of involving all varieties of natural conditions of soil, rain-fall and atmosphere, and of being subject to all of the indigenous weed species of the locality, with seeding from the immediate weed population and often from surrounding areas. In other words, they are areas where the weed population and its growth are predominantly the result of natural conditions.

My invention provides an improved method of weed control, and improved herbicidal compositions for the practice of the method, in such extended natural areas which normally support a varied weed population. I have discovered that, in properly controlled dosage, 2,3,6-trichlorobenzoic acid and its salts (not including its esters), have a wide-spectrum herbicidal and soil sterilizing action, which moreover is of extraordinarily long persistence both in the soil and in plant structures. The 2,3,6-trichlorobenzoic acid and its salts remain in the soil and are effective over a much longer period than a known and used herbicide, such as 2,4-dichlorophenoxy acetic acid, commonly called "2,4-D." The present herbicide also is not, in general, metabolized by woody plants, and woody plants damaged during one growing season by the present herbicide do not come back fully the following growing season. These effects are obtained with economically feasible dosages; and by limitation of the dosage it is possible to obtain wide-spectrum, long-lasting weed control in crop areas without damage to robust monocots such as corn.

It was previously known that 2,3,6-trichlorobenzoic acid has auxin activity, J. A. Bently, Nature 165, No. 4194, 449, March 18, 1950, and investigators at Boyce Thompson Institute confirmed this in certain modes of application upon three species of "crop" plants namely, tomato, stivia and tobacco when growing in pots under controlled conditions. Contributions, Boyce Thompson Institute January, March 1951, pages 209 to 213. The observed effects under these essentially laboratory or hothouse conditions gave no promise of any special or unusual actions such as I have discovered to be present in my different use of this chemical and of which I avail myself in my novel method of weed control in extended natural areas supporting a varied weed population. The uncompromising nature of this isomer was indicated also by investigations of 2,3,6-trichlorobenzoic acid esters, in contrast to my discovery of the highly advantageous effects peculiar to its acid and the salts as I use them. The esters of 2,3,6-trichlorobenzoic acid are relatively ineffective as herbicides.

The compounds of herbicidal effect which are used in my invention are: (1) 2,3,6-trichlorobenzoic acid; (2) the salts of that acid; (3) mixed isomers of polychlorobenzoic acid or of these salts in which the 2,3,6-isomeric form is present in herbicidally or synergistically effective amount; and (4) mixtures of two or more of the foregoing with one another, or of one or more of the foregoing with one or more other herbicidal compounds, in which the 2,3,6-isomeric form of trichlorobenzoic acid or salt is present in herbicidally effective amount, with or without synergistic effect.

Such salts, either alone or in combination with the acid, may be used in place of the 2,3,6-trichlorobenzoic acid to achieve substantially the same results. Some of the salts are relatively water soluble while other salts are relatively insoluble or only slightly soluble. While I do not know why both the relatively soluble and the relatively insoluble salts are such highly efficient herbicides, it is believed that the salts in the presence of moisture liberates the acid radical. Water solubility is not the controlling factor.

As used herein the term "salts" includes the metal salts, the ammonium salt and the amine salts of the acid, in other words all of the salts of 2,3,6-trichlorobenzoic acid. Esters are not considered salts. Of the metal salts I prefer the alkali and alkaline earth metal salts, particularly from the sandpoint of cost. Illustrative but not the only salts which may be used are the salts of sodium, potassium, lithium, calcium, barium, magnesium, aluminum, iron, zinc, manganese, cadmium, butylamine, octylamine, 2-ethylhexylamine di(2-ethylhexylamine) and triethanolamine. Other primary, secondary and tertiary amines may be used. In any particular application of the salt, any preference will be influenced by a number of factors, including the solubility characteristics of the salt which fit the particular type of formulation which is to be used.

I have found that certain mixtures consisting predominately of isomers of trichlorobenzoic acid or salt containing 2,3,6-isomer produce unexpected results when used as a herbicide. For example, a mixture of trichlorobenzoic acid isomers containing about 70% of the 2,3,6-isomer gives results substantially equivalent to those of the pure 2,3,6-isomer. The other isomers present when used individually do not have a herbicidal activity at all comparable with the 2,3,6-isomer. Consequently, it would be supposed that such other isomers would have a diluent effect when mixed with the 2,3,6-isomer, requiring the use of an increased dosage of the mixture to give results comparable to those of the 2,3,6-isomer alone. Nevertheless, this mixture of isomers has been tested on a pound for pound basis and found to be as effective as pure 2,3,6-trichlorobenzoic acid. The total effect of the mixed isomer product is greater than the sum of the effects of the 2,3,6-isomer and the other isomers taken independently. In such a mixture, the 2,3,6-isomer is both herbicidally and synergistically effective, that is, it contributes its herbicidal action and either contributes or participates in a synergistic action by which the herbicidal activity of the whole is greater than the sum of the individual herbicidal activities.

The preferred mixture of isomers of trichlorobenzoic acid or salt for herbicidal use is one which in terms or isomer composition contains at least about 60% of the 2,3,6-isomer based on the total weight of the mixed isomers. Various mixtures of isomers containing up to about 90% of the 2,3,6-isomer have been tested and found to be as effective, if not more effective as herbicides than the pure 2,3,6-isomer. Reduction of the content of the 2,3,6-isomer below about 50% reduces the herbicidal activity of the mixture below the substantial equality with that of an equal weight of the 2,3,6-isomer alone but the synergistic action is still present and the mixture has greater activity than would be expected on the basis of the sum of the individual activities of the several isomers.

In the particular mixture of isomers referred to above, the herbicidal materials present other than the 2,3,6-isomer are predominantly other tri-isomers, and chiefly the 2,4,5-isomers of trichlorobenzoic acid or salt. There usually is a small content of dichlorobenzoic acid or salt and of tetrachlorobenzoic acid or salt, or both. Depending on the method of production some other isomer such as the 2,3,5-isomer may be the one chiefly present, other than the 2,3,6-isomer. My invention in its broader aspects includes the use of various mixed isomers of polychlorobenzoic acid containing a herbicidally and synergistically effective amount of the 2,3,6-isomer of trichlorobenzoic acid or salt.

The foregoing remarks concerning the equivalency of the salts of 2,3,6-trichlorobenzoic acid to this acid as a herbicide are equally applicable to the salts of the mixed isomers of trichlorobenzoic acid.

DOSAGES

In general, the dosage, expressed here as the amount of herbicide per acre, is influenced by a number of factors including the particular type of weeds to be controlled, the presence or lack of a crop which is not to be damaged and other factors normally affecting the dosage of a herbicide. The desired dosage in any particular instance is also influenced by the amount of rainfall and the character of the soil. Sandy or loose soil requires relatively less herbicide, whereas heavy soil, particularly soil having a high organic content, requires somewhat more herbicide. Soil located so that the water tends to wash across it requires somewhat larger amounts of herbicide. Having regard to these various factors, the particular dosage to be applied in any particular instance may be readily determined by referring to the more detailed comments which follow concerning the dosages to be used.

The dosages referred to throughout this application are expressed as the equivalent weight of acid. Where the acid form is used or is being referred to, the stated dosage weight is the actual weight applied to or referred to. Where a salt is being used or being referred to, the stated dosage refers to the amount of acid which is equivalent to the actual quantity of salt applied to the unit area. In other words, it is the amount of acid that is reacted with the proper quantity of salt former to produce the quantity of salt actually applied. Where a salt is used, the actual weight of salt to be applied may be calculated from the stated dosage by multiplying the dosage weight by the following fraction:

$$\frac{\text{Molecular weight of trichlorobenzoic salt}}{\text{Molecular weight of trichlorobenzoic acid}}$$

The effectiveness of a salt is substantially the same as the effectiveness of the equivalent weight of the acid.

In extended natural areas containing no crop, the dosage is at least about 5 pounds per acre and ranges up to 50 pounds or more per acre, when using only the 2,3,6-trichlorobenzoic acid or salt or the mixed isomers containing from 50% to 90% of such acid or salt. In the case of such mixed isomers, where the mixture is substantially equivalent in herbicidal effect to an equal amount of the pure 2,3,6-isomer, the dosage, in terms of 2,3,6-isomer may therefore be as low as about 2.5 pounds per acre, as when the 2,3,6-isomer is 50% of the mixture.

This minimum dosage of 5 pounds per acre is used where the weed population of the area consists predominantly of the more susceptible weed species such as ragweed, lambsquarters, pigweed, smartweed, peppergrass, carpetweed, velvetweed, wild buckwheat, sorrel and the like, and where the soil and rainfall conditions are favorable to the herbicidal effect. In such areas, even this minimum dosage gives a prolonged residual action as compared with a herbicide such as "2,4-D." Where there is any substantial content of more resistant species in the weed population, and the aim is to control even a minor content of such species, or where these more resistant species predominate, the minimum dosage is about 10 pounds per acre for substantially full control under favorable conditions as to soil and rainfall, although lower dosages down to the general minimum of about 5 pounds per acre have a substantial and useful effect. These more resistant species are exemplified by dandelion, plantain, wild carrot, crabgrass, and horse nettle and by the woody plants such as poison ivy, wild cherry, sumac, ash, birch, red maple, white maple, hazelnut, red oak, white oak, black oak, alder, bayberry, sycamore, etc.

Dosages in excess of these respective minimum values are used in such non-crop areas when the weed growth is dense and well established, or when soil or rainfall conditions are less favorable to the herbicidal effect, or when a more prolonged residual effect is desired in order to lessen still more the frequency of application that is needed to maintain control. Very large dosages up to 50 pounds or more per acre are used when the aim is to achieve and to maintain soil sterilization, and especially where woody plants exist and the aim is not only to damage the current foliage but also to gain a lethal or severe stunting effect carrying into the next growing season.

In crop areas currently under cultivation, even the above minimum dosage of 5 pounds per acre would be excessive because of the great potency and long residual effect of the herbicide upon such species as beans, beets, cucumbers, alfalfa, peanuts, squash, canteloupe, buckwheat, rape, rye, oats, wheat, rive, golden millet and the like. Pre-emergent treatment of an area with such a dosage would prevent growth of such crops for a period of weeks or even months, depending on the soil, the rainfall and the depth of cultivation. However, with a reduced dosage, it is possible to achieve good weed control in areas devoted to certain crops such as the robust monocotyledonous plants, as described and claimed in my previously referred to applications executed November 16, 1956. Thus, I have achieved such weed control by both post-emergent and pre-emergent treatment of fields devoted to "corn," that is to say, to *Zea mays,* including all varieties such as field corn, sweet corn, pop corn, Holcus (including various sorghums) and Saccharum (including various sugar canes).

In such crop areas, the preferred dosage range is from about 0.5 pound per acre to about 3 pounds per acre for pre-emergent treatment, with an optimum under all but extreme conditions of soil and rainfall of from 0.75 pound to 1.5 pounds per acre. For post-emergent treatment, the maximum safe dosage is lower, being about 2 pounds per acre and the comparable optimum range is essentially the same, although I prefer not to exceed about 1.25 pounds per acre except for the most resistant crop species or under the most unfavorable conditions as to soil and rainfall. Within these ranges, the dosage varies according to these natural conditions and according to the susceptibility of the crop, field corn for example being able to tolerate a somewhat higher dosage than sweet corn. Again, for the case of the mixed trichlorobenzoic isomers containing 50% to 90% of the 2,3,6-isomer, the dosages here given are for the entire mixture as an essential equivalent of the pure 2,3,6-isomer, and therefore the dosage in terms of the 2,3,6-isomer alone is expressed by a figure down to about 0.25 pound per acre depending on the content of 2,3,6-isomer in the mixture.

In a corn crop area the present herbicide may be applied pre-emergently or post-emergently. When the herbicide is applied during the period defined as including the period from soil preparation prior to planting time to a time a week or more after planting but subject to the general limitation of being the period of preparation of the soil for planting and the time substantial week growth is incipient. When applied post-emergently, the area will contain an established growing corn crop where the growing corn crop will have achieved substantial growth. There is no limitation as to maximum growth of the corn crop which may have occurred prior to treatment as long as the necessary equipment can enter the area without undue damage to the corn crop.

In the foregoing, the dosage data have been stated in terms of the equivalent weight of acid, and for cases where the only herbicide used is either the 2,3,6-trichlorobenzoic acid or salt or the mixed isomers of essentially equivalent herbicidal effect containing from about 50% to about 90% of the 2,3,6-trichlorobenzoic acid or salt. These "2,3,6" herbicides however are capable of effective use in admixture with other herbicidal compounds as described below, where they contribute their broad spectrum and prolonged residual actions. Such other herbicides include both other polychlorinated benzoic compounds as well as compounds of quite different chemical structure, and it is becoming increasingly evident that in a number of such mixtures the 2,3,6-trichlorobenzoic acid or salt induces or participates in a synergistic action, in addition to contributing its individual herbicidal action, whereby the mixture attains a total herbicidal potency beyond the sum of the individual herbicidal effects of the respective constituents, much as in the case of the mixed trichlorobenzoic isomers already described.

For all such cases involving mixture of the 2,3,6-trichlorobenzoic acid or salt, or the equivalent mixed trichlorobenzoic isomers with one or more other herbicidal compounds, the minimum effective dosage in terms of the content of such "2,3,6" material is about 0.5 pound per acre for cases where the minimum dosage of the mixed herbicides is about 5 pounds per acre, as in the treatment of non-crop areas. For example, the mixture of herbicides may contain as little as 10% of such "2,3,6" material, and yet this content has a substantial and useful herbicidal effect, and in some instances a synergistic effect also, when the dosage of the mixture is such as to apply at least about 0.5 pound per acre of such "2,3,6" material. The applied dosage of "2,3,6" material is greater when the content of such material in the mixture exceeds 10%, or when the dosage of the mixture exceeds 5 pounds per acre.

To summarize then, it is to be understood that when I speak of a minimum dosage of about 0.5 pound per acre of "2,3,6" material I include (1) the case of a mixed herbicide applied in a dosage of at least 5 pounds per acre to a non-crop area, and also (2) the case of treatment of a crop area with the "2,3,6" material alone or with a mixed herbicide which contains the "2,3,6" material and which is applied in a dosage up to about 3 pounds per acre, or more commonly not over about 2 pounds per acre.

Again, it is to be noted that these dosage figures for the "2,3,6" material are in terms of acid equivalent and, in the case of the mixed trichlorobenzoic isomers containing about 50% to about 90% of 2,3,6-trichlorobenzoic acid or salt, are for the acid equivalent of the total mixed isomers of the trichlorinated material, the actual dosage of 2,3,6-isomer itself is lower in proportion as the content of 2,3,6-isomer in the mixture is lower, and ranges down to 0.25 pound per acre for the case of a mixture which contains 60% of 2,3,6-isomer and which is applied in a dosage of 0.50 pound per acre, giving a minimum useful effect in crop areas.

Having regard to the conceivable case of a mixture of herbicides applied to a crop area in a dosage of 1 to 2 pounds per acre, and containing only about 10% of "2,3,6" material, the actual amount of "2,3,6" material thereby applied would be 0.1 to 0.2 pound per acre. I do not regard that as a herbicidally effective amount of "2,3,6" material, in any significant sense, when not accompanied by a synergistic action. Therefore as a practical minimum embracing all cases where the "2,3,6" material has a significantly useful herbicidal effect, I use the figure of about 0.5 pound per acre of "2,3,6" material (meaning both the pure 2,3,6-trichlorobenzoic acid or salt and also the equivalent mixed trichlorobenzoic isomers), or else the corresponding figure of 0.25 pound per acre of 2,3,6-trichlorobenzoic acid (or salt expressed as acid equivalent) for the case of the mixed isomers containing about 50% of 2,3,6-trichlorobenzoic acid (or salt expresed as acid equivalent) when applied in the minimum dosage of about 0.5 pound of mixture per acre.

SUSCEPTIBLE PLANTS

This invention, in its application yielding optimum results, affords in extended natural areas a control of the growth of weeds of all species falling in the botanical families, sub-families or tribes listed below and collectively referred to herein as group A Plants.

Group A Plants

Abietineae  
Festuceae  
Paniceae  
Salicaceae  
Fagaceae  
Polygonaceae  
Chenopodiaceae  
Papilionoideae  
Anacardiaceae  
Convolvuleae  
Plantaginaceae The variety and wide range of these plants, which in general are the more susceptible and the more common weeds of which control is sought, shows the wide spectrum nature of the invention. Speaking generally, most natural areas which create a need or an occasion for weed control contain in some abundance three or more weed species falling in this group A. In one of its narrower aspects, my invention includes the control of weed growth in an area normally supporting growth of three or more such species by the application to the area of a herbicidally effective dosage of a "2,3,6" herbicide as herein described.

In a broader aspect, the invention includes the control, by the same means, of weed growth in an extended natural area normally supporting growth of one or more weeds of either group A above or of the following group B, which consists of families, sub-families or tribes of plants that include some species that are less susceptible to the action of the described herbicide (although still materially susceptible) or are less commonly encountered.

Group B Plants

Hordeae  
Corylaceae  
(Betulaceae)  
Ameranthaceae  
Cruciferae  
Euphorbiaceae  
Malveae  
Hibisceae  
Umbelliferae  
Asclepiadaceae  
Asteraea  
Heliantheae  
Cynareae  
Cichlorieae To particularize and further exemplify the broad spectrum nature of this invention, I list below over 150 species of plant which have been found to be susceptible in material degree to the herbicidal action of the "2,3,6" material described above. The number of susceptible species exceeds the number of items listed because, as will be noted, some ten items of the list are not individual species but rather are groups of related species all of which are susceptible, these being named collectively with the usual "spp" indication of "all species." This list is not exhaustive.

Not all of these species are equally affected in growth by a given dosage, and of course the same dosage does not have the same effect on a given species under different conditions as to soil, rainfall, density of growth, stage of growth or mode of application of the herbicide. Use of the respective minimal dosages described above for different situations produces some material herbicidal action, and the preferred use of larger dosages in any particular case gives both a more intense action and a more prolonged action. Except in crop areas, the dosage may be increased safely well above the minimum, and is preferably so increased not only to assure greater damage to any existing growth but also to prolong the characteristically well maintained residual action of this "2,3,6" material, especially in the soil, thereby reducing the frequency of treatment needed to maintain the desired control. In crop areas, where a maximum dosage limit is imposed by the necessity of protecting the crop, or of not unduly delaying the planting after pre-emergent treatment of the soil surface, the dosages described above have a material effect on practically all of the listed species, and others as well, but the damage to some species is less than is needed to effect a full control. However, in most parts of the country where corn is grown extensively, the make-up of the usual weed population is such that good weed control is obtained with a dosage within the range stated above, the effect being to increase the crop growth very substantially by suppression or elimination of the competitive weed growth.

*Abies balsamea* (balsam fir)  
*Picea abies* (Norway spruce)  
*Picea sitchensis* (Sitka spruce)  
*Pinus* spp. (pines)  
*Bromus commutatue* (hairy cheat)  
*Bromus secalinus* (cheat)  
*Bromus tectorum* (downy chess)  
*Festuca elatior* (tall fescue)  
*Festuca rubra* (red fescue)  
*Lonicera laciniatus* (honeysuckle)  
*Rubus japonica* (blackberry)  
*Poa annua* (annual bluegrass)  
*Dactylis glomerata* (orchardgrass)  
*Eragostis cilianensis* (stink grass)  
*Agropyron repens* (quackgrass)  
*Hordeum jubatum* (wild barley)  
*Hordeum pussillum* (little barley)  
*Danthonia spicata* (poverty grass)  
*Cynodon dactylon* (Bermuda grass)  
*Digitaria ischaemum* (smooth crabgrass)  
*Digitaria sanguinales* (crabgrass)  
*Panicum capillare* (old witch-grass)  
*Panicum repens* (witch-grass)  
*Panicum dichlotomiflorum* (fall panicum)  
*Setaria lutescens* (yellow foxtail)  
*Setaria viridis* (green foxtail)  
*Echinochloa crusgalli* (barnyard grass)  
*Echinochloa frumentaceae* (Jananese millet)  
*Cenchrus longispinus* (sandbur)  
*Cenchrus pauciflorus* (field sandbur)  
*Sorghum halepense* (Johnson grass)  
*Salix* spp. (willows)  
*Populus alba* (white poplar)  
*Carya* spp. (hickory)  
*Corylus* spp. (hazel)  
*Carpinus coroliniana* (blue beech)  
*Fagus grandifolia* (beech)  
*Quercus alba* (white oak)  
*Quercus borealis* (red oak)  
*Quercus ilicifolia* (scrub oak)  
*Quercus laevis* (turkey oak)  
*Quercus macrocarpa* (fur oak)  
*Quercus marilandica* (blackjack oak)  
*Quercus stellata* (post oak)  
*Ulmus* spp. (Elm)  
*Polygonum pennsylvanicum* (Penn. smartweed)  
*Polygonum persicaria* (lady's thumb)  
*Polygonum convolvus* (wild buckweed)  
*Polygonum hydropiper* (Common smartweed)  
*Polygonum aviculare* (knot weed)  
*Polygonum punctatum* (water smartweed)  
*Polygonum lapathifolium* (pale smartweed)  
*Polygonum cuspidatum* (Japanese knotweed)  
*Polygonum sagittatum* (arrow-leaved tearthumb)  
*Polygonum scandens* (climbing false buckwheat)  
*Rumex acetosella* (sheep sorrel)  
*Rumex crispus* (curl dock)  
*Rumex obtusifolius* (broadleaved dock)  
*Chenopodium album* (lamb's quarter)  
*Chenopodium ambrosioides* (wormseed)  
*Halogeton glomeratus* (halogeton)  
*Amaranthus albus* (tumbleweed)  
*Amaranthus retroflexus* (rough pigweed)  
*Amaranthus hybridus* (green amaranth)  
*Amaranthus spinosus* (spring amaranth)  
*Mollugo verticillata* (carpet weed)  
*Stellaric media* (chickweed)  
*Lynchis alba* (white campion)  
*Portulaca oleraceae* (purslane)

*Nelumbo nucifera* (sacred Lotus)
*Sassafras albidum* (sassafras)
*Brassica napus* (annual rape)
*Brassica rapa* (yellow rocket)
*Brassica hirta* (wild mustard)
*Brassica kaber* var. *pinnatifida* (wild mustard)
*Brassica juncea* (Indian mustard)
*Brassica nigra* (black mustard)
*Raphanus raphanistrum* (wild radish)
*Liquidambar styraciflua* (sweet gum)
*Amelanchier florida* (service berry)
*Crataegus monogyna* (English hawthorn)
*Rubus spectabilis* (salmon berry)
*Prunus* spp. (cherry)
*Prosopia juliflora* (mesquite)
*Robina pseudo-acacia* (black locust)
*Euphorbia apocynifolia* (flowering spurge)
*Euphorbia corollata*
*Euphorbia cyparissias* (cypress spurge)
*Euphorbia esula* (leafy spurge)
*Euphorbia maculata* (eyebane)
*Euphorbia marginata* (snow-on-the-mountain)
*Euphorbia supina* (milk purslane)
*Rhus radicans* var. *vulgaris* (poison ivy)
*Rhus toxicondendron* (poison oak)
Rhus spp. (sumac)
*Ilex vomitoria* (yaupon)
*Acer* spp. (maple)
*Ceanothus velutinus* (snow brush)
*Malva neglecta* (common mallow)
*Abutilon theopraste* (velvet leaf)
*Hibiscus sabdariffa* (kenaf)
*Hibiscus trionum* (Flower-of-an-hour)
*Tilia* spp. (basswood)
*Daucas carota* (wild carrot)
*Tsuga heterophylla* (western hemlock)
*Fraxinus americana* (white oak)
*Asclepias* spp. (milkweed)
*Asclepias incurnata* (swamp milkweed)
*Asclepias purpurascens* (purple milkweed)
*Asclepias syriaca* (common milkweed)
*Asclepias tuberosa* (butterflyweed)
*Convolvulus arvensis* (field bindweed)
*Convolvulus sepium* (hedge bindweed)
*Convolvulus pellitus* forma *anestius* (Japanese bindweed)
*Ipomoea purpurea* (morning glory)
*Ipomoea lacunosa* (small-flowered white morning glory)
*Ipomoea coccinea* (small red morning glory)
*Ipomoea pandurata* (wild potato vine)
*Ipomoea hederacea* (ivy-leaved morning glory)
*Lamium amplexicaule* (henbit)
*Lamium purpureum* (red dead-nettle)
*Solanum carolinense* (horse nettle)
*Solanum nigrum* (black nightshade)
*Solanum dulcamera* (bittersweet nightshade)
*Plantago aristata* (bracted plantain)
*Plantago major* (broadleaf plantain)
*Plantago rugelii* (rugel plantain)
*Plantago virginica* (Hoary plantain)
*Plantago lanceolata* (buckhorn plantain)
*Galium aparine* (cleavers)
*Galium mollugo* (bedstraw)
*Galium verum* (yellow bedstraw)
*Erigeron annuus* (Daisy-fleabane)
*Erigeron canadensis* (bitterweed)
*Ambrosia artemisiifolia* var. *elatior* (ragweed)
*Ambrosia trifida* (giant ragweed)
*Helianthus petiolaris* (sand sunflower)
*Helianthus annus* (sunflower)
*Helianthus tuberosus* (Jerusalem artichoke)
*Cirsium altissimum* (tall thistle)
*Cirsium arvense* (Canada thistle)
*Cirsium horridulum* (yellow thistle)
*Cirsium pumilum* (pasture thistle)
*Cirsium hirsuta* (bull thistle)
*Cirsium muticum* (swamp thistle)
*Taraxacum officinale* (dandelion)
*Sonchus asper* (spiny-leaved sow-thistle)
*Sonchus oleraceus* (common sow thistle)
*Sonchus arvensis* (perennial sow thistle)

COMPOSITIONS

The herbicides, i.e. 2,3,6-trichlorobenzoic acid the aforementioned mixed isomers of trichlorobenzoic acid, or the salts of these acids, which are used in carrying out my invention, may be applied as such but are preferably applied in compositions formulated for some related purpose. Generally, the present herbicide is mixed with a liquid vehicle (carrier) in such a manner as to form an emulsion or solution. When the acid form is used, or a salt that is not sufficiently soluble in water to form an aqueous solution of the desired concentration, then the material is preferably dissolved in a water immiscible, hydrocarbon solvent, for example xylene, fuel oil or kerosene, preferably containing a surface active emulsifying agent which aids in dispersing the solution in water to form a water-in-oil type of emulsion or dispersion for spray application. For example ethylene oxide-fatty acid and fatty acid amine-ethylene oxide condensation products may be used for this purpose. Other surface active agents may be used, for example, the surface active agents for forming oil in water emulsions listed in the article by McCutcheon entitled "Synthetic Detergents and Emulsifiers" in Soap and Chemical Specialties, July-October, 1955. Emulsions which may be used also are described in copending applications Serial No. 582,333, filed May 3, 1956, now abandoned, and Serial No. 583,925, filed May 10, 1956, now abandoned, by T. A. Gerard and assigned to the assignee of this application. However, the herbicide can be dissolved in a water miscible solvent particularly where water is not used for subsequent dilution which might cause precipitation of the acid or water soluble salt. The particular solvent used is influenced by the solubility characteristics of the herbicide. In order to facilitate shipping and handling, the concentration of herbicide in liquid should be relatively high and preferably the 2,3,6-trichlorobenzoic acid or its salt should constitute at least, and preferably more than 5–10% by weight of the composition regardless of whether or not other isomers are present. The solution can be dispersed in water or further diluted by the user to form an emulsion, dispersion or solution having the desired concentration for application to the area.

Where the salt of the herbicide trichlorobenzoic acid is to be used and if the salt is sufficiently water soluble, the herbicide can be dissolved in water instead of forming an emulsion or dispersion. The sodium salt has the advantage of being as effective as a relatively insoluble form such as the acid. The sodium salt as well as the ammonium or water soluble amine salts may be dissolved in water to form a solution of the desired concentration. While in most instances the application of dispersions or solution is followed, the herbicides may be formulated as wettable powders or used with solid carriers and dusted on the area to be treated. For instance, the trichlorobenzoic acid may be mixed with a solid carrier, for example, diatomaceous earth, fuller's earth, bentonite or clay and formulated with a wetting agent or with a suspending agent or it may be mixed with or adsorbed upon particles of a carrier such as finely divided vermiculite, an ion exchange material including ion exchange, organic materials and ion exchange inorganic clays. It is recognized that when the present herbicides either in the acid or the salt form are mixed with solid carriers, a complex salt may be formed. However, for present purposes these materials will be considered inert and the herbicide is the acid or salt mixed therewith. In most but not all instances, the herbicide will be mixed with an adjuvant such as a surface active agent, a finely divided solid carrier or a liquid carrier, particularly a hydrocarbon liquid. However, the present invention is not limited to the use of such adjuvants.

MANNER OF APPLICATION

The present herbicide may be applied in any suitable manner and form and by means of any suitable equipment. In most cases the herbicide will be applied in the form of a spray and customary spraying apparatus will be used for this purpose, the particular manner of application as well as the equipment used may be varied depending upon the character of the area being treated and the particular species of plants growing therein. The customary spraying apparatus may be used for applying the herbicide in the form of a solution or emulsion and this apparatus may operate at various pressures, possess nozzles with various orifice sizes and otherwise differ in character from simple low-gallonage (10–20 gallons per acre) to special high-gallonage apparatus (100-300 gallons per acre). The concentration of herbicide in the solution, dispersion or emulsion so sprayed being adjusted by the user to apply to the area the proper quantity of herbicide per acre. In this connection the user may prefer to apply the herbicide uniformly over the area being treated or may prefer, for example, when treating a corn field, to apply the herbicide in strips or bands, such strips being the corn rows, particularly when the herbicide is applied pre-emergently or the area between the rows, particularly when applied post-emergently. When the area contains a considerable quantity of brush or trees, the herbicide may be applied to the foliage until it drips.

While the spraying of dispersions or solutions is the preferred and more generally used mode of application, the present herbicide may be formulated as a wettable powder and sprayed as a suspension or may be formulated with solid carriers and dusted on the area to be treated with suitable dusting equipment being employed. When dusting equipment is employed, the equipment generally is used in such a manner as to apply the dust both to the foliage of the plants in the area, as well as to the soil. Regardless of the form or mode of application, the dosages mentioned herein as being applied to a unit of area are the average dosages per unit of area, it being understood that some portions in the area may require a variation from the average, particularly where some portions of the area contain plants requiring a larger amount of herbicide and such plants are not uniformly distributed over the area.

An especially effective way to treat an extended natural area having an established weed growth is to apply a spray of liquid or powdered herbicidal composition with some care to deliver the spray not only to the foliage but also to the soil surface that is accessible by way of the spaces between plants and between the leaves of the plants. A moderately heavy aerial spray directed to reach the entire area (and substantially reaching its entirety) accomplishes this dual attack, and therefore the present admonition is largely against the selective spraying of foliage alone if optimum results are to be had. In an extended natural area treated aerially, there is always some drip to the ground as well as some translocation to ground within most if not all plant species; but for maximum effect it is advisable not to rely upon that alone but to apply the spray directly to all accessible areas of the soil surface as well as to the foliage proper. In this way, one obtains not only or principally the herbicidal effect of the material accepted through the foliage but also a higher degree of the long persisting residual action of the "2,3,6" material in the soil, which is one of its remarkable effects that I have discovered.

In some instances for certain types of plants, particularly trees, it may be desirable to utilize the frill or basal bark treatment. In the basal bark treatment the herbicide may be sprayed onto the bark, usually near the base of the tree including the root crown. In the frill treatment, a cut is made through the bark and the herbicide sprayed into the cut. Both types of treatment may be used to kill the tree and prevent resprouting from the root system. While these treatments may be used alone, they may be combined with spraying of the area, with spray application inhibiting other species of growth in the area, particularly where the other growth is susceptible to lower minimum dosage. The fact that the frill or basal treatments are desirable, for example in treating some of the trees in an area which also is subjected to a general spraying, does not mean that the broadcast spraying of the area does not inhibit the trees also subjected to the frill or basal treatments. Many trees are susceptible to all forms of treatment. For example, turkey oak is susceptible to foliage spray and basal spray. Thus, if an area contains such a tree or trees and also other plants requiring a smaller dosage of herbicide, then the entire area may be sprayed at a relatively smaller dosage that will kill the other plants in the area and the effect on the turkey oak fortified by a basal spray, thus, obtaining maximum effect over the entire area with a minimum quantity of herbicide.

MIXTURES OF HERBICIDES

While there is more particularly described herein the application of the present herbicide to an area where the 2,3,6-isomer material is the only herbicide, the present invention is not limited to the application of this herbicide alone. The 2,3,6-trichlorobenzoic acid or its salts may be used in combination with another herbicide to produce unexpected, synergistic effects or to obtain results not obtainable with the amount of 2,3,6-trichlorobenzoic acid which is used. However, in any such instance, the amount of 2,3,6-trichlorobenzoic acid or its salts which is applied to the area will be herbicidally effective against at least some of the plant growth present in or subsequently appearing in the area and will be used in a herbicidally effective amount. The present herbicide may be used, for example, with 3-p-chlorophenyl-1,1-dimethyl urea, 3-phenyl-1,1-dimethyl urea, 3-(3,4-dichlorophenyl)-1,1-dimethyl urea, 3-amino-1,2,4-triazole, α-chloro-N,N-diallylacetamide, α-chloro-N,N-diethylacetamide, 2,2-dichloropropionic acid, trichloroacetic acid, 2,4-dichlorophenoxyacetic acid, the salts, esters and amides of the aforesaid acids, and mixtures thereof. The use of such a mixture of herbicides is described in my copending application Serial No. 583,899, filed May 10, 1956, now abandoned. The 2,3,6-trichlorobenzoic acid or its salt may be used also in admixture with herbicidally effective polychlorinated benzoic acids such as tetrachlorobenzoic acid, particularly 2,3,5,6-tetrochlorobenzoic acid

ADVANTAGES

As is apparent from the foregoing discussion and as will become more readily apparent in the following examples, the present herbicide (which term includes 2,3,6-trichlorobenzoic acid, the mixed isomers of trichlorobenzoic acid containing a relatively high content of the 2,3,6-isomer and described heretofore, and the salts of these acids) has many advantages over other known herbicides. The present herbicide is a wide spectrum herbicide effective against a large variety of species of plant growth. The properties of the present herbicide and the well known and widely used 2,4-dichlorophenoxy acetic acid, commonly referred to as "2,4-D," are strikingly different in many important respects. While it is well known that 2,4-D is relatively ineffective in controlling monocotyledonous plants the present herbicide is generally considerably more effective and controls, for example, Johnson grass seedlings, and established Johnson grass at reasonable rates of application whereas 2,4-D is ineffective for this purpose. The present herbicide has an extremely long residual activity when applied to the soil whereas 2,4-D has only a relatively transient herbicidal effect. The prolonged effect of the present herbicide produces many obvious advantages. For example, when used in a corn field the farmer can vary the time when he works the field if such working is necessary. When used pre-emergently in the corn field, the present herbicide is highly effective even though the farmer is delayed in cultivating the field as a result of weather conditions or work load. This prolonged effect also reduces the frequency of application and one application can be effective through an entire growing season against a large variety of plants, whereas, many other herbicides are only effective against a smaller variety of plants for a small part of the growing season. Further, the present herbicide is stored by woody perennials and is not metabolized by this type of plant. Plants that are treated with the present herbicide during one summer but not completely killed come back in a greatly weakened condition the second summer. In contrast woody perennials that are not killed by 2,4-D come back the following summer in full vigour.

As a result of special herbicidal effects of the present herbicide it can be used not only as a selective herbicide in the cornfield, but may be used to sterilize the soil in an extended natural area and prevent substantially all plant growth for a prolonged period, may be used to inhibit the growth of a large variety of plants in an area such as a roadside, may be used to inhibit both annual weeds and woody plants as often encountered in areas under power lines, and to inhibit high infestations of particularly undesirable plants such as poison ivy, poison oak, mesquite, brush, and the like. The present herbicide is highly effective in destroying honeysuckle vines. Also the present herbicide can be produced economically and is a practical herbicide satisfying the many requirements of a commercially successful herbicide for both general and particular use.

The following examples illustrate the present invention but the present invention is not limited to the particular species of plants set forth in these examples or to the dosages described except as clearly set forth therein.

In the following examples where a mixture of isomers of trichlorobenzoic acid or its salt containing about 70% by weight of the 2,3,6-isomer is used, the mixed isomers of trichlorobenzoic acid had the following composition not varying by more than 2%:

| | Percent |
|---|---|
| 2,3,4-trichlorobenzoic acid | 7.00 |
| 2,3,5-trichlorobenzoic acid | 1.00 |
| 2,3,6-trichlorobenzoic acid | 69.00 |
| 2,4,5-trichlorobenzoic acid | 22.00 |
| 2,4,6-trichlorobenzoic acid | 1.00 |

This particular mixture resulted from the manner in which it was produced, however, this herbicide can be produced in other ways and the proportion of the 2,3,6-isomer to the other isomers can vary as well as the amounts of the other isomers relatively to each other. Also this herbicide can be produced by methods wherein the trichlorinated fraction is not separated from the dichlorinated and tetrachlorinated fractions. In the latter event, it is preferable that the mixture contain a high percentage of trichlorobenzoic acid including the 2,3,6-isomer and a higher percentage of tetrachlorobenzoic acid than dichlorobenzoic acids. The tetrachlorobenzoic acid fraction preferably contains the 2,3,5,6-isomer.

*Example I*

This work was carried out with narrow leaved plantain (*Plantago lanceolata*) and sorrel (*Rumex acetosella*) plants about six to eight inches high. Different groups of these plants were sprayed with one of the various herbicides tested and the dosage for each herbicide was varied as indicated. The following table shows the results as observed 14 days after spraying. The numerical values of 0 to 5 indicate increasing effectiveness as compared to 0 value for the non-sprayed controls.

TABLE
PLANTAIN

| Dosage, lb./acre | Herbicide | | |
|---|---|---|---|
| | A | B | C |
| 1 | 1 | 1 | 1 |
| 2 | 1 | 1 | 1 |
| 4 | 1 | 2 | 2 |
| 8 | 2 | 2 | 3 |
| 16 | 3 | 3 | 4 |

SORREL

| 1 | 1 | 1 | 1 |
|---|---|---|---|
| 2 | 4 | 3 | 2 |
| 4 | 5 | 4 | 3 |
| 8 | 5 | 5 | 4 |
| 16 | 5 | 5 | 5 |

NOTE.—A—Represents the sodium salt of 2,3,6-trichlorobenzoic acid. B—Represents the sodium salt of 2,4-dichlorophenoxyacetic acid. C—Represents the triethanolamine salt of 2,4-dichlorophenoxyacetic acid.

*Example II*

This series of comparative tests were carried out in outdoor plots overgrown with poison ivy approximately 2.5 feet high. The herbicides were sprayed onto the plots and the plants therein and the results observed 12 weeks later. The results are set forth in the following table with the numerical values of 0 to 10 indicating increasing effectiveness.

TABLE

| Herbicide | 4 lb./acre | 16 lb./acre |
|---|---|---|
| A | 3 | 9 |
| B | 5 | 10 |
| C | 8 | 10 |

NOTE.—A—Represents the sodium salt of mixed isomers of trichlorobenzoic acid containing about 70% of the 2,3,6-isomer. B—Represents a 50-50 mixture of the sodium salt of mixed isomers of trichlorobenzoic acid and the triethanolamine salt of 2,4-dichlorophenoxyacetic acid. C—represents the triethanolamine salt of 2,4-dichlorophenoxyacetic acid.

*Example III*

Plots overgrown with sumac and some birch saplings about 2–2.5 feet high were sprayed with various herbicides at a dosage of 16 lbs./acre, equivalent acid. Both kerosene and water solutions were used and control plots were sprayed with the same volume of kerosene as used in the kerosene-herbicide treated plots. The results are set forth in the following table based on observations made about 22 weeks after treatment.

TABLE

| Material | Effect, percent kill | |
|---|---|---|
| | Sumac | Birch |
| Kerosene control | None | None |
| A | 100 | 100 |
| B | 100 | 100 |
| C | 100 | 100 |
| D | 100 | 100 |
| E | 100 | 100 |

NOTE.—A—Mixed isomers of trichlorobenzoic acid dissolved in kerosene. B—Kerosene solution of 2,4-dichlorophenoxyacetic acid and 2,4,5-trichlorophenoxyacetic acid in a 2:1 ratio. C—Aqueous solution of the sodium salt of Mixed trichlorobenzoic acid isomers. D—Aqueous solution of the triethanolamine salt of 2,4-dichlorophenoxyacetic acid. E—An aqueous dispersion of mixed trichlorobenzoic acid isomers. The mixed trichlorobenzoic acid isomers contained about 70% 2,3,6-trichlorobenzoic acid, about 20% 2,4,5-trichlorobenzoic acid and about 10% of other isomers of trichlorbenzoic acid.

*Example IV*

Various woody plants growing wild and varying in height from 2 to 10 feet were sprayed with aqueous dispersions of two herbicides. Since the plants varied so in size the dosage per acre varied somewhat although the average dosages were 15 and 30 lbs./acre.

TABLE

| Plant species | Herbicide A | | Herbicide B | |
|---|---|---|---|---|
| | 15 lb./acre | 30 lb./acre | 15 lb./acre | 30 lb./acre |
| Sumac | 100% kill | 100% kill | 100% kill | 100% kill. |
| Sassafras | 100% kill | 100% kill | 100% kill | 100% kill. |
| Wild cherry | Light dieback | Some dead, some dieback | Some dead, some dieback | More dead, rest dieback. |
| Blackberry | No effect | No effect | | |

NOTE.—"Herbicide A"—An aqueous dispersion of mixed isomers of trichlorobenzoic acid containing 70% of the 2,3,6-isomer
"Herbicide B"—An aqueous dispersion of 2,4-dichlorophenoxyacetic acid and 2,4,5-trichlorophenoxyacetic acid in a 2:1 ration.
"Dieback"—Means that terminal branches were killed but the main trunk was alive.

Example V

Areas containing honeysuckle as well as poison ivy and blackberry were sprayed with aqueous solutions of the sodium salt of the mixed isomers of trichlorobenzoic acid and other such areas were sprayed with emulsions of the mixed isomers of trichlorobenzoic acid. In each instance the mixed isomers contained about 70% of the 2,3,6-isomer. The emulsions and solutions contained 5, 10 and 20 pounds per gallon, respectively, of the acid or an equivalent amount of salt. The plants were thoroughly wetted with the spray to the point of "drip." All of the plants were destroyed and this effect still existed when the areas were observed eight months later.

Honeysuckle overgrows many acres of land in the South and prevents these areas from being used in forest production. Spraying such an area overgrown with honeysuckle vines at the rate of about 12 pounds per acre of the mixed isomer of trichlorobenzoic acid has been found sufficient to destroy about 95% of the honeysuckle growth.

Example VI

A wettable powder was prepared by thoroughly mixing 45 pounds of the mixed isomers of trichlorobenzoic acid containing about 70% of the 2,3,6-isomer and 55 pounds of finely divided clay. There also was added to the mixture about 0.5 pound each of the sodium salt of an alkyl substituted sulfuric acid and of the sodium salt of isethionic acid. After being thoroughly mixed, the mixture was mixed with water to form a suspension which was sprayed onto areas to be treated.

A dust type of formulation was prepared by dissolving 72 pounds of the mixed isomers of trichlorobenzoic acid in 200 pounds acetone and this solution was then mixed with clay particles most of which would pass a 20 mesh but be retained on a 40 mesh screen. This mixture was dried to remove the acetone to form a dust for application as a sprayed dust.

Both the suspension of wettable powder in water and the dust were broadcast by suitable spraying and dusting equipment over areas containing various weeds. It was found that the amount of herbicide applied in either form was as effective as a similar amount of the mixed isomers applied as an emulsion.

Example VII

In this field, the corn (New Jersey No. 7 field corn) was planted with the aid of a planter in rows 36 inches apart and was fertilized in one operation. The herbicide was applied four days after planting and before emergence of the corn or weeds. The ground was medium heavy loam and was moist at the time of planting. The area between the rows as well as along the rows was sprayed and there was no cultivation at any time.

In the following table under "Weed Control" and also under "Injury Data" (I), relative values from 0 to 10 have been used, with "0" indicating no observable effect and "10" indicating the greatest effect. "Size" (S) under "Effect on Corn" indicates the height of the corn with the higher numbers indicating the smallest size. The results were observed at the stated number of days after planting.

TABLE

| Dosage, lbs./acre | Weed control | | | | | | | | | | | | Effect on corn | | | | | | | | | | |
|---|---|---|---|---|---|---|---|---|---|---|---|---|---|---|---|---|---|---|---|---|---|---|---|
| | 34 days | | | | 69 days | | | | 80 days | | | | Injury data, 34 days | | | | Injury "I" and size "S" data, 80 days | | | | | | |
| | | | | | | | | | | | | | | | | | A | | B | | C | | D | |
| | A | B | C | D | A | B | C | D | A | B | C | D | A | B | C | D | I | S | I | S | I | S | I | S |
| 0.25 | 2 | 2 | 2 | 0 | 3 | 1 | 1 | 0 | 2 | 3 | 1 | 1 | 0 | 0 | 0 | 0 | 0 | 5 | 0 | 1 | 0 | 2 | 0 | 8 |
| 0.5 | 6 | 6 | 4 | 4 | 6 | 6 | 1 | 1 | 7 | 7 | 1 | 1 | 0 | 0 | 0 | 0 | 0 | 1 | 0 | 0 | 0 | 4 | 0 | 5 |
| 0.75 | 6 | 6 | 4 | 4 | 5 | 6 | 2 | 1 | 7 | 8 | 3 | 3 | 0 | 0 | 0 | 0 | 0 | 1 | 0 | 0 | 0 | 1 | 0 | 2 |
| 1.0 | 8 | 8 | 6 | 6 | 7 | 7 | 2 | 3 | 8 | 8 | 3 | 3 | 0 | 1 | 0 | 0 | 0 | 0 | 0 | 0 | 0 | 3 | 0 | 1 |
| 1.5 | 10 | 10 | 6 | 6 | 9 | 9 | 2 | 2 | 9 | 9 | 3 | 1 | 1 | 1 | 1 | 0 | 0 | 0 | 0 | 0 | 0 | 1 | 0 | 5 |

NOTE.—A—Sodium salt of trichlorobenzoic acid mixed isomers containing 70% 2,3,6-isomer. B—Trichlorobenzoic acid mixed isomers containing 70% 2,3,6-isomer. C—Triethanolamine salt of 2,4-dichlorophenoxyacetic acid. D—Butoxyethanol ester of 2,4-dichlorophenoxyacetic acid.

The dosages of A, C and D are set forth as the weight of acid equivalent to the weight of material actually applied. The actual weight applied of either A, C or D was the weight obtained by multiplying the dosage weight set forth above by the following fraction.

$$\frac{\text{Molecular weight of A, C or D}}{\text{Molecular weight of the corresponding acid}}$$

As to the control of the weeds, both the acid and salts of trichlorobenzoic acid used in these experiments gave good control at 0.5 and 0.75 lbs./acre and excellent control at 1.0 and 1.5 lbs./acre. The good to excellent weed control by both forms persisted for 80 days with no cultivation, whereas the herbicidal effectiveness of the 2,4-dichlorophenoxyacetic acid compounds was markedly reduced after 34 days. The herbicidal trichlorobenzoic acid gave considerably better control of annual weeds than did the 2,4-dichlorophenoxyacetic acid compounds.

As to the effect on the corn, there were slight epanastic effects observed at 34 days as indicated, but even with the highest dosages there were no deleterious effects revealed at the end of the 80 days period. The most vigorous corn was in those areas treated with either the soluble sodium form or acid form of trichlorobenzoic acid. The ear development was appreciably further advanced in those areas treated with the two forms of herbicidal trichlorobenzoic acid, particularly the areas treated with the higher dosages.

Areas not treated with herbicides were choked with weeds; and the corn in such areas was greatly stunted and there was no appreciable development of the ears. In the areas treated, the corn appeared to be suppressed in accordance with the weed population and, as a result, grew taller in the areas in which weed control was effective.

Additional areas were treated with the same dosages of a mixture of sodium salt of trichlorobenzoic acid and triethanolamine salt of 2,4-dichlorophenoxyacetic acid and a mixture of trichlorobenzoic acid and butoxyethanol ester of 2,4-dichlorophenoxyacetic acid, such mixtures being equal parts by weight of their respective compounds. While these mixtures produced better results than the 2,4-dichlorophenoxyacetic acid compounds alone, from the standpoint of weed control and effect on corn the results were not as outstanding as those obtained with the herbicidal trichlorobenzoic acid or its sodium salt.

*Example VIII*

In this field test, an area was planted with New Jersey No. 106 sweet corn in rows. Twenty-seven days after planting and when the growing corn and weeds were fairly high, certain rows were treated as hereinafter described. In one part of this area the rows were divided into three groups and the rows of one group were treated with the sodium salt of mixed isomers of trichlorobenzoic acid containing about 70% 2,3,6-isomer, 22% 2,4,5-isomer and 8% other isomers. The amount of sodium salt applied per acre was equivalent to 0.35 pound per acre of 2,3,6-trichlorobenzoic acid or 0.5 pound per acre of trichlorobenzoic acid. The second group of rows were treated with the triethanolamine salt of 2,4-dichlorophenoxyacetic acid in an amount equivalent to 0.5 pound per acre of 2,4-dichlorophenoxyacetic acid. The third group of rows were not treated and were used as control rows.

In the other part of the area, the rows also were divided into three groups and one group was treated with a herbicidal composition containing the sodium salt of the same mixed isomers of trichlorobenzoic acid. The amount of herbicidal composition applied was equivalent to 0.7 pound per acre of 2,3,6-trichlorobenzoic acid or 1.0 pound per acre of the mixed isomer of trichlorobenzoic acid. The second group of rows was treated with a herbicidal composition containing the triethanolamine salt of 2,4-dichlorophenoxyacetic acid. The amount of trimethanolamine salt applied was equivalent to 1.0 pound per acre of 2,4-dichlorophenoxyacetic acid. The third or control group of corn rows was not treated. The herbidical compositions were applied over the entire area treated including the corn, the weeds and the soil by spraying.

The area was observed 16 days after treatment and the results are set forth in the following table. The effectiveness of the herbicide was determined by comparison with the control rows to which an effectiveness of "0" was assigned. Effectiveness on the weeds is expressed with numerals 1–10 in the order of increasing effectiveness. There was no observable damage to the corn. The effectiveness of weed control in the rows treated with the equivalent of 0.35 pound per acre of 2,3,6-trichlorobenzoic acid was 6. The treatment with the equivalent of 0.5 pound per acre of 2,4-dichlorophenoxyacetic acid produced the same result.

In the other part of the field area, the higher dosage of the sodium salt produced an effectiveness value on the weeds of 6 while the higher dosage of the triethanolamine salt of 2,4-dichlorophenoxyacetic acid produced an effectiveness of 7. For comparison, the results observed at 16 days are set forth in the following table with the dosages representing the equivalent amount of acid.

TABLE

| Dosage, lbs./acre | Effect on weeds | |
|---|---|---|
| | Sodium salt of 2,3,6-trichlorobenzoic acid | Triethanolamine salt of 2,4-dichlorophenoxyacetic acid |
| 0.35 | 6 | |
| 0.7 | 6 | |
| 0.5 | | 6 |
| 1.0 | | 7 |

The corn was harvested from the area 77 days after spraying. The ears were counted and weighed and effectiveness of weed control noted. The results are set forth in the following table.

TABLE

| First part of area | Number of ears | Weight of ears in lbs. | Weed control |
|---|---|---|---|
| 0.35 lb./acre of A | 126 | 72.5 | 6 |
| 0.5 lb./acre of B | 111 | 62 | 7 |
| None, controls | 90 | 51.2 | 0 |
| 0.7 lb./acre of A | 109 | 55.2 | 6 |
| 1.0 lb./acre of B | 118 | 66 | 8 |
| None, controls | 58 | 26.7 | 0 |

NOTE.—A—Represents the sodium salt of 2,3,6-trichlorobenzoic acid. B—Represents the triethanolamine salt of 2,4-dichlorophenoxyacetic acid.

The control rows were not cultivated and the weed growth was very heavy, particularly in the control rows of the second portion of the area.

*Example IX*

Each of a series of field areas which had been cultivated and were free of all plants, were sprayed with either the mixed isomers of trichlorobenzoic acid, the sodium salt of the mixed isomers of trichlorobenzoic acid, the butoxyethanol ester of 2,4-dichlorophenoxyacetic acid or p-chlorophenyl-1,1-dimethyl urea. The dosage was 10 pounds per acre in each case for the first three herbicides calculated as the acid. The p-chlorophenyl-1,1-dimethyl urea was applied at the rate of 10 pounds per acre of this compound. Group 1 plots in these areas were planted with rape and group 2 plots were planted with alsike clover. Rape was planted in half and alsike clover in the other half of group 3 plots in these areas. One series of plantings was made three days prior to spraying and a second series of plantings was made 38 days after spraying. The plots of groups 1 and 2 were exposed to regular rainfall while those of group 3 were additionally watered at the rate of one inch per week. The plots of each group included plots of each of the series of herbicides as well as non-treated control plots. At 48 days after spraying there were no live plants in the plots of the first planting that had been sprayed with the herbicides.

The plots planted 38 days after spraying were observed at periods of 7, 15, 21 and 27 days after planting and the plant development compared with that in the control plots planted at the same time but in which the soil had not been chemically treated. The results of these observations are set forth in the following table with the effect of the chemical treatment being expressed by the numerals 0 through 5 in increasing order so that 0 indicates no effect as determined from the controls and 5 indicates a total or complete effect. The letters, "D," "S," and "I" indicate density, size and injury, respectively. Thus, the numeral "5" under "D" indicates that there were no plants or almost no plants.

TABLE
GROUP 1—RAPE

| Material | Days after planting | | | | | | | | | | | |
|---|---|---|---|---|---|---|---|---|---|---|---|---|
| | 7 | | | 15 | | | 21 | | | 27 | | |
| | D | S | I | D | S | I | D | S | I | D | S | I |
| A | 4 | 3 | 4 | 3 | 4 | 4 | 4 | 4 | 3 | 4 | 4 | 4 |
| B | 2 | 3 | 3 | 3 | 3 | 3 | 3 | 3 | 3 | 3 | 3 | 3 |
| C | 4 | 3 | 1 | 3 | 3 | .1 | 3 | 3 | 1 | 2 | 3 | 1 |
| D | 0 | 0 | 1 | 5 | 3 | 4 | 3 | 5 | | 5 | | |

GROUP 11—CLOVER

| A | 0 | 1 | --- | 2 | 4 | 4 | 5 | 4 | 4 | 5 | | |
| B | 0 | 1 | --- | 3 | 4 | 4 | 5 | | | 5 | | |
| C | 0 | 1 | --- | 2 | 1 | 1 | 2 | 3 | 1 | 2 | 3 | 1 |
| D | 0 | 0 | 1 | 5 | | | 5 | | | 5 | | |

GROUP 111—RAPE

| A | 2 | 3 | 2 | 3 | 4 | 4 | 4 | 4 | 4 | 4 | 4 | 4 |
| B | 2 | 3 | 3 | 3 | 3 | 4 | 3 | 3 | 3 | 3 | 3 | 3 |
| C | 2 | 2 | 1 | 3 | 3 | 2 | 2 | 3 | 1 | 2 | 3 | 1 |
| D | 0 | 0 | 1 | 3 | 4 | 3 | 5 | | | 5 | | |

GROUP 3—CLOVER

| A | 0 | 1 | --- | 3 | 4 | 4 | 5 | | | 5 | | |
| B | 0 | 1 | --- | 3 | 4 | 4 | 5 | | | 5 | | |
| C | 0 | 1 | --- | 2 | 3 | 2 | 3 | 3 | 3 | 3 | 3 | 1 |
| D | 0 | 0 | 1 | 5 | | | 5 | | | 5 | | |

NOTE.—A—Represents mixed isomers of trichlorobenzoic acid. B—Represents sodium salt of mixed isomers of trichlorobenzoic acid. C—Represents butoxyethanol ester of 2,4-dichlorophenoxyacetic acid. D—Represents p-chlorophenyl-1,1-dimethyl urea.

The mixed isomers of trichlorobenzoic acid contained about 70% 2,3,6-isomer, about 20% 2,4,5-isomer and about 10% other isomers.

As to the volunteer weeds, not planted, the plots treated with the mixed isomers of trichlorobenzoic acid, either the acid or sodium salt form, contained no annual weeds and only a few severely damaged horsenettle. The plots treated with the 2,4-dichlorophenoxyacetic acid ester contained a few velvetweed and crabgrass and more horsenettle which was less severely damaged than in the plots treated with the mixed isomers. In the p-chlorophenyl-1,1-dimethyl urea treated plots there were no annual weeds but more horsenettle which was less affected as to size than in plots treated with the trichlorobenzoic acid herbicides although the horsenettle had yellowed. In the control plots which were neither chemically treated nor planted with seeds, there was a considerable amount of carpetweed, some velvetweed and crabgrass and more horsenettle than in the treated plots.

The mixed isomers of trichlorobenzoic acid, both the acid form and sodium salt form were definitely superior to the 2,4-dichlorophenoxyacetic acid compound in effective persistence to the soil.

Example X

This example describes tests made under comparable conditions utilizing the sodium salt of 2,3,6-trichlorobenzoic acid and a mixture of isomers of trichlorobenzoic acid which contain 93–95% of 2,3,6-trichlorobenzoic acid. Both of these herbicides were tested on rape, lambsquarters, timothy and golden millet by planting the seeds in soil and then applying the herbicides at dosages corresponding to 1 lb. per acre and 2 lbs. per acre of area treated. The amount of salt applied was an amount equivalent to the dosage weight of acid. In the past it has been observed and consistently found, that the various salts of the acids are as effective as the acid when the salts are applied in the equivalent amount of acid. The results obtained are set forth in the following table in which the numerals 1 to 5 indicate increasing effectiveness of the materials. D means density, S means size and I means injury. Thus D–5 would indicate the fewest plants, S–5 the most stunting and I–5 the greatest injury. These values were determined by comparison with plants grown under identical conditions but to which no herbicide was applied. A represents the sodium salt of 2,3,6-trichlorobenzoic acid and B represents the mixed isomers.

TABLE
RAPE

| Herbicide | 1 lb./acre | | | 2 lb./acre | | |
|---|---|---|---|---|---|---|
| | D | S | I | D | S | I |
| A | 3 | 3 | 3 | 4 | 3 | 3 |
| B | 2 | 3 | 3 | 4 | 4 | 4 |

LAMBSQUARTERS

| A | 2 | 3 | 3 | 3 | 4 | 4 |
| B | 2 | 3 | 3 | 3 | 3 | 4 |

TIMOTHY

| A | 3 | 3 | 3 | 4 | 4 | 4 |
| B | 4 | 3 | 3 | 4 | 3 | 3 |

GOLDEN MILLET

| A | 2 | 4 | 3 | 4 | 4 | 4 |
| B | 4 | 3 | 3 | 5 | 3 | 4 |

Example XI

A series of flats were prepared and planted with golden millet and rape. The materials in question were sprayed on to the flats the same day as the planting and the observations compared in the table were made 12 days after spraying. The concentration of materials sprayed was adjusted to provide the dosages set forth in the table.

In this table, values 0 to 5 indicate increasing effectiveness of the materials tested, D means density, S means size and I means injury. Thus, D–5 indicates the fewest plants per unit area, S–5 the most stunting and I–5 the greatest injury. These values were determined by comparison with flats planted and treated in the same manner except that no herbicidal material was applied to the flats. The material A contained 68% of 2,3,6-trichlorobenzoic acid and the material B contained 48% of this isomer. The 2,3,6-isomer content was determined by analysis.

TABLE

| Material sprayed | Percent 2,3,6 | Golden millet | | | | | | Rape | | |
|---|---|---|---|---|---|---|---|---|---|---|
| | | Pounds per acre | | | | | | | | |
| | | 1.0 | | | 2.0 | | | 2.0 | | |
| | | D | S | I | D | S | I | D | S | I |
| A | 68 | 4 | 3 | 3 | 5 | 2 | 2 | 3 | 3 | 1 |
| B | 48 | 3 | 3 | 3 | 4 | 2 | 1 | 2 | 1 | 2 |

The material B which contained only approximately 48% of the 2,3,6-isomer was almost as active herbicidally as material A which contains approximately 68% 2,3,6-isomer. The mixture of isomers of trichlorobenzoic acid containing about 50% or more of the 2,3,6-isomer produces a synergistic effect and have considerably more herbicidal activity when compared with other isomer mixtures of trichlorobenzoic acid than the content of the 2,3,6-isomer would indicate.

Example XII

In this series of comparative tests, groups of flats containing soil were planted with rape, lambsquarters, timothy and golden millet seed, respectively. In each group of flats, a series of dilute solutions of various salts of trichlorobenzoic acid in water were applied at dosages equivalent to 1 and 2 pounds of acid per acre. For comparative purposes, flats in each group were treated with the triethanolamine salt of "2,4-D" at dosages equivalent to 1 and 2 pounds per acre of the acid. Flats not treated with herbicide were used as controls. Each flat contained seeds of only one kind and was treated with only one herbicide at one dosage. When herbicide was applied it was applied the same day the flat was planted. In all cases except one, the salts of trichlorobenzoic acid were salts of the mixed isomers. In the case of the tert-butylamine salt, a salt of substantially pure 2,3,6-trichlorobenzoic acid was tested along with a salt of the mixed isomers and these salts are distinguished in the following table by the terms "2,3,6-isomer" and "mixed isomers," respectively.

In the following table, the results are set forth as observed 12 days after planting. In this table, the letters "D" "S" and "I" refer to density of the plants, size of the plants and injury to the plants, respectively. The effectiveness of the herbicides, as determined by comparison with the controls, is indicated by the numerals "0" through "5" in increasing order of effectiveness. Thus, "0" indicates no herbicidal effect while "5" indicates extreme effectiveness.

| Herbicide | Rape | | | | | |
|---|---|---|---|---|---|---|
| | 1 lb./acre | | | 2 lbs./acre | | |
| | D | S | I | D | S | I |
| Magnesium salt | 3 | 2 | 3 | 4 | 3 | 3 |
| Calcium salt | 3 | 3 | 3 | 4 | 3 | 3 |
| Barium salt | 4 | 2 | 3 | 4 | 4 | 4 |
| t-Butylamine salt (2,3,6-isomer) | 3 | 3 | 3 | 4 | 3 | 3 |
| t-Butylamine salt (mixed isomers) | 2 | 3 | 3 | 4 | 4 | 4 |
| t-Octylamine salt | 3 | 3 | 3 | 4 | 3 | 3 |
| Potassium salt | 2 | 2 | 3 | 4 | 4 | 3 |
| Lithium salt | 3 | 3 | 3 | 4 | 3 | 3 |
| Manganese salt | 4 | 3 | 3 | 4 | 4 | 4 |
| Aluminum salt (basic) | 1 | 2 | 2 | 4 | 3 | 3 |
| Iron salt (basic) | 0 | 2 | 2 | 3 | 3 | 3 |
| Zinc salt (basic) | 2 | 3 | 3 | 4 | 3 | 3 |
| Sodium salt | 3 | 3 | 3 | 4 | 4 | 4 |
| 2-4-D | 4 | 4 | 4 | 4 | 5 | 5 |

| Herbicide | Lambsquarters | | | | | |
|---|---|---|---|---|---|---|
| | 1 lb./acre | | | 2 lbs./acre | | |
| | D | S | I | D | S | I |
| Magnesium salt | 2 | 3 | 3 | 3 | 4 | 4 |
| Calcium salt | 2 | 3 | 3 | 4 | 4 | 4 |
| Barium salt | 2 | 3 | 3 | 3 | 4 | 4 |
| t-Butylamine salt (2,3,6-isomer) | 2 | 3 | 3 | 3 | 4 | 4 |
| t-Butylamine salt (mixed isomers) | 2 | 3 | 3 | 3 | 4 | 4 |
| t-Octylamine salt | 3 | 3 | 3 | 3 | 4 | 4 |
| Potassium salt | 3 | 3 | 3 | 3 | 4 | 4 |
| Lithium salt | 3 | 3 | 3 | 3 | 4 | 4 |
| Manganese salt | 2 | 3 | 3 | 3 | 3 | 4 |
| Aluminum salt (basic) | 1 | 2 | 2 | 2 | 2 | 2 |
| Iron salt (basic) | 1 | 2 | 2 | 2 | 3 | 2 |
| Zinc salt (basic) | 2 | 2 | 2 | 4 | 4 | 4 |
| Sodium salt | 3 | 3 | 3 | 4 | 4 | 4 |
| 2-4-D | 0 | 3 | 0 | 2 | 3 | 1 |

| Herbicide | Timothy | | | | | |
|---|---|---|---|---|---|---|
| | 1 lb./acre | | | 2 lbs./acre | | |
| | D | S | I | D | S | I |
| Magnesium salt | 3 | 3 | 3 | 4 | 3 | 3 |
| Calcium salt | 3 | 3 | 3 | 4 | 3 | 3 |
| Barium salt | 4 | 4 | 3 | 4 | 4 | 4 |
| t-Butylamine salt (2,3,6-isomer) | 3 | 3 | 3 | 4 | 4 | 4 |
| t-Butylamine salt (mixed isomers) | 3 | 3 | 3 | 4 | 3 | 4 |
| t-Octylamine salt | 4 | 3 | 3 | 4 | 4 | 4 |
| Potassium salt | 4 | 3 | 3 | 4 | 3 | 3 |
| Lithium salt | 3 | 3 | 3 | 4 | 3 | 3 |
| Manganese salt | 3 | 2 | 3 | 4 | 3 | 3 |
| Aluminum salt (basic) | 3 | 3 | 3 | 4 | 4 | 4 |
| Iron salt (basic) | 4 | 3 | 3 | 4 | 3 | 4 |
| Zinc salt (basic) | 4 | 3 | 3 | 4 | 3 | 4 |
| Sodium salt | 4 | 3 | 3 | 4 | 3 | 4 |
| 2-4-D | 4 | 4 | 1 | 4 | 3 | 1 |

| Herbicide | Golden millet | | | | | |
|---|---|---|---|---|---|---|
| | 1 lb./acre | | | 2 lbs./acre | | |
| | D | S | I | D | S | I |
| Magnesium salt | 2 | 4 | 3 | 2 | 4 | 4 |
| Calcium salt | 2 | 3 | 3 | 3 | 4 | 4 |
| Barium salt | 2 | 4 | 3 | 3 | 3 | 4 |
| t-Butylamine salt (2,3,6-isomer) | 2 | 4 | 3 | 4 | 4 | 4 |
| t-Butylamine salt (mixed isomers) | 2 | 4 | 3 | 3 | 4 | 4 |
| t-Octylamine salt | 3 | 3 | 3 | 3 | 3 | 3 |
| Potassium salt | 2 | 3 | 3 | 4 | 4 | 4 |
| Lithium salt | 2 | 3 | 3 | 4 | 4 | 4 |
| Manganese salt | 2 | 4 | 3 | 3 | 4 | 4 |
| Aluminum salt (basic) | 1 | 3 | 3 | 3 | 4 | 3 |
| Iron salt (basic) | 0 | 3 | 2 | 2 | 3 | 2 |
| Zinc salt (basic) | 2 | 4 | 3 | 4 | 3 | 3 |
| Sodium salt | 1 | 3 | 3 | 3 | 3 | 3 |
| 2-4-D | 4 | 3 | 0 | 5 | 4 | 1 |

I claim:

A process for the control of bindweed comprising applying to a locus of bindweed infestation a herbicidally effective amount of a compound selected from a group consisting of 2,3,6-trichlorobenzoic acid and its salts.

References Cited in the file of this patent

UNITED STATES PATENTS

| | | |
|---|---|---|
| 2,394,916 | Jones | Feb. 12, 1946 |
| 2,695,804 | Leppla | Nov. 30, 1954 |
| 2,724,643 | Morris et al. | Nov. 22, 1955 |
| 2,726,947 | Baumgartner | Dec. 13, 1955 |

OTHER REFERENCES

Zimmerman et al. in "Contributions from Boyce Thompson Inst.," vol. 16, No. 5, January-March 1951, pages 209 to 213 incl.

Jones et al. in "Biochemical Journal," vol. 48, No. 4, 1951, pages 422 to 425 incl.

Hamilton et al. in "Proc. NE. Weed Control Conference," Jan. 2–4, 1952, pages 65 to 73.

Miller in "Weeds," January 1952, pages 185 to 188.